(12) United States Patent
Kawai et al.

(10) Patent No.: US 6,199,404 B1
(45) Date of Patent: Mar. 13, 2001

(54) MANUFACTURING METHOD FOR GAS DISCHARGE TYPE DISPLAY PANEL

(75) Inventors: Michifumi Kawai, Tokyo; Ryohei Satoh, Yokohama; Masahito Ijuin, Fujisawa; Tomohiko Murase, Kawasaki; Takao Terabayashi, Yokohama; Nobuyuki Ushifusa, Yokohama; Yoshihiro Kato, Yokohama; Shigeaki Suzuki, Fujisawa; Seiichi Tsuchida, Yokosuka; Yutaka Naito; Seiichi Yasumoto, both of Tokyo; Osami Kaneto, Chigasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/955,092

(22) Filed: Oct. 21, 1997

(30) Foreign Application Priority Data

Oct. 21, 1996 (JP) .................................................. 8-277701
Jul. 14, 1997 (JP) .................................................. 9-187965

(51) Int. Cl.$^7$ .................................................. C03B 13/01
(52) U.S. Cl. .................................. 65/102; 65/33.2; 65/36; 65/60.3; 65/60.1; 65/60.8; 427/96; 427/383.5; 427/428
(58) Field of Search ........................... 65/102, 33.2, 36, 65/60.3, 60.1, 60.8; 427/96, 383.5, 428

(56) References Cited

U.S. PATENT DOCUMENTS

| 4,280,939 | * | 7/1981 | Johnson ........................... 260/23 AR |
| 5,853,446 | * | 12/1998 | Carre et al. ........................... 65/17.3 |

FOREIGN PATENT DOCUMENTS

| 50-152661 | 12/1975 | (JP) . |
| 51-30861 | 3/1976 | (JP) . |
| 8-273538 | 10/1996 | (JP) . |
| 9-283017 | 10/1997 | (JP) . |

* cited by examiner

Primary Examiner—Stanley S. Silverman
Assistant Examiner—Michael P. Colaianni
(74) Attorney, Agent, or Firm—Antonelli, Terry, Stout & Kraus, LLP

(57) ABSTRACT

A manufacturing method for a gas discharge type display panel makes it possible to manufacture an environmentally friendly substrate with high accuracy and yet at low cost. According to the manufacturing methods electrodes are formed on a back substrate by photolithography or printing, then a glass paste is printed to a height of approximately 10 μm–500 μm by printing. A barrier rib blanks are produced by rolling under pressure the glass paste by using a roller provided with grooves. The roller is heated in advance. The barrier rib blanks are sintered into the barrier ribs.

10 Claims, 11 Drawing Sheets

MANUFACTURING METHOD FOR GAS DISCHARGE TYPE DISPLAY PANEL

FIELD OF THE INVENTION AND RELATED ART STATEMENT

The present invention relates to a gas discharge type display panel and a manufacturing method for the same. The present invention further relates to a displaying arrangement which employs the gas discharge type display panel. The present invention relates, more particularly, to the formation of barrier ribs for isolating the address electrodes on a back substrate of the gas discharge type display panel from each other.

In general, a gas discharge type display panel is provided with a front substrate and a back substrate disposed to cooperate with the front substrate to define a discharge space therebetween. The back substrate is provided with a glass plate, a plurality of address electrodes formed on the glass plate in parallel to each other, barrier ribs formed among the address electrodes, which maintain a gap between the front substrate and the back substrate as well as isolate luminous regions of red, green and blue colors, and a fluorescencer applied to the interiors of the cells defined by the barrier ribs and the side surfaces of the barrier ribs.

The barrier ribs are usually formed using a stacking method or a engraving method.

In the former method, a glass paste is repeatedly printed on a predetermined portion of the glass plate, using a mask screen, thereby obtaining the barrier ribs of desired dimensions. In the latter method, a layer of a glass paste of determined dimensions is formed on the entire surface of the glass plate. The glass paste is removed from all portions other than the portions corresponding to the barrier ribs by sandblasting so as to obtain the barrier ribs of the predetermined dimensions.

These methods require long time to form the barrier ribs and a glass paste cannot be used effectively.

As another means for forming the barrier ribs, there is a replication method disclosed in JP-A-8-273538. According to the replication method, a flat stamper is prepared, which has a complementary configuration of a barrier rib array. After of a glass paste is applied onto the entire surface of the glass plate in a thin layer, the stamper is pressed against the glass paste to transfer the pattern onto the glass paste. The glass paste is cured, and then the stamper is removed therefrom.

In the replication method, the stamper is flexible so that it can be easily removed from the rigid glass plate. The stamper is gradually removed from an edge of the glass plate. If the stamper is rigid, then it would require a large force to peel off, at one stroke, the rigid stamper from the glass plate, which is in surface contact with the rigid glass plate. This may cause damage to the stamper due to high stress produced in the stamper.

The flexible stamper is fabricated by forming a die made of a polymer material applied on a polymer base film. Most polymer materials are easily deformed by external force or heat. Therefore, the stamper elastically deforms under a pressing force when it is pressed against the thin layer of the glass paste which has been applied all over the surface of the glass plate. For this reason, the forming accuracy of the barrier ribs is not high. Furthermore, when the stamper plastically deforms due to the heat for curing the glass paste or due to other reason, the required forming accuracy for the barrier ribs can no longer be obtained, so that the stamper has to be frequently replaced by a new one.

Thus, the flexible stamper has problems in that the barrier rib forming accuracy is not satisfactory and the service life is limited, making it unsuited for the mass production of display panels. Besides, the manufacturing cost of the display panels becomes high.

Furthermore, on forming the barrier ribs arranged in a grid pattern, it is necessary to provide the barrier rib with a large taper to readily remove the stamper from the glass plate. However, provision of such a large taper makes it difficult to narrow the gaps among the barrier ribs. A display panel with higher resolution cannot be obtained.

OBJECT AND SUMMARY OF THE INVENTION

It is an object of the present invention to provide a manufacturing method for a display panel which solves the problems described above.

To this end, according to the present invention, there is provided a manufacturing method for a gas discharge type display panel comprising the steps of applying a glass paste to a substrate on which electrodes have been formed, of rotating a roll, on which grooves corresponding to barrier ribs have been formed, in order to form the glass paste applied to the substrate into barrier rib blanks, and of sintering the formed barrier rib blanks to obtain barrier ribs.

The present invention will now be described in detail in conjunction with embodiments thereof with reference to the accompanying drawings.

DETAILED DESCRIPTION OF PREFERRED EMBODIMENTS

Figure 1:
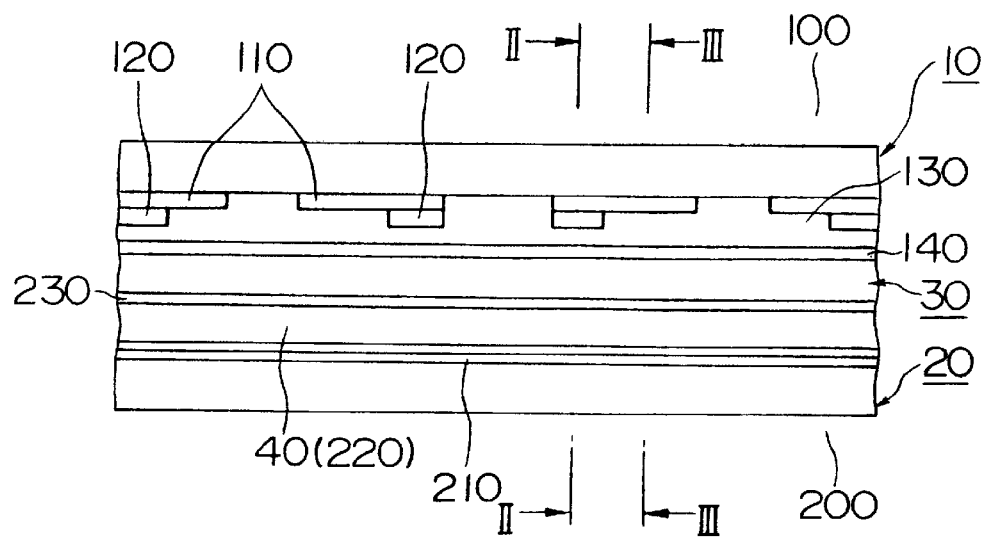
FIG. 1 is a fragmentary sectional view of a gas discharge type display panel in accordance with the present invention, taken along the line I—I of FIG. 2.
Figure 2:
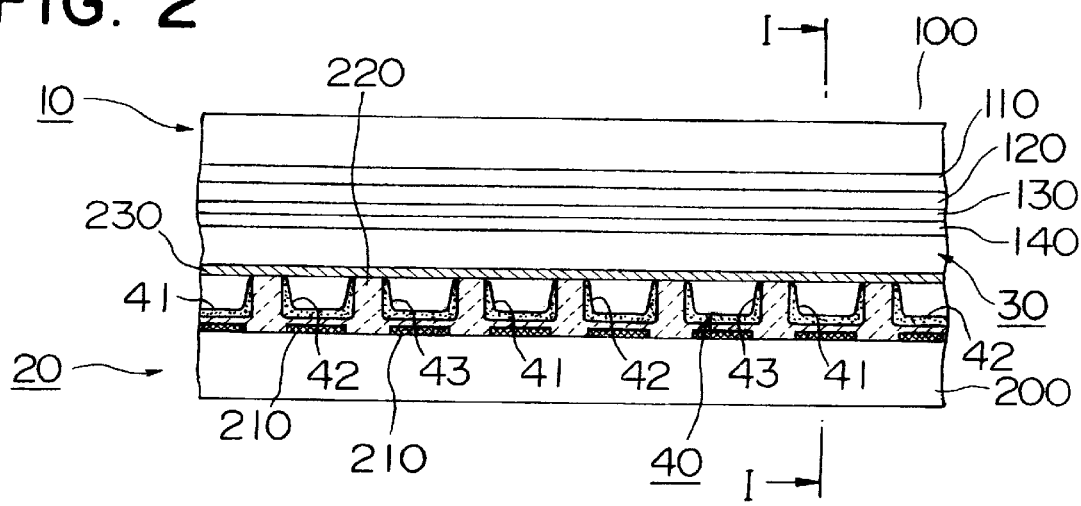
FIGS. 2 and 3 are sectional views taken along the lines II—II and III—III of FIG. 1, respectively.
Figure 3:
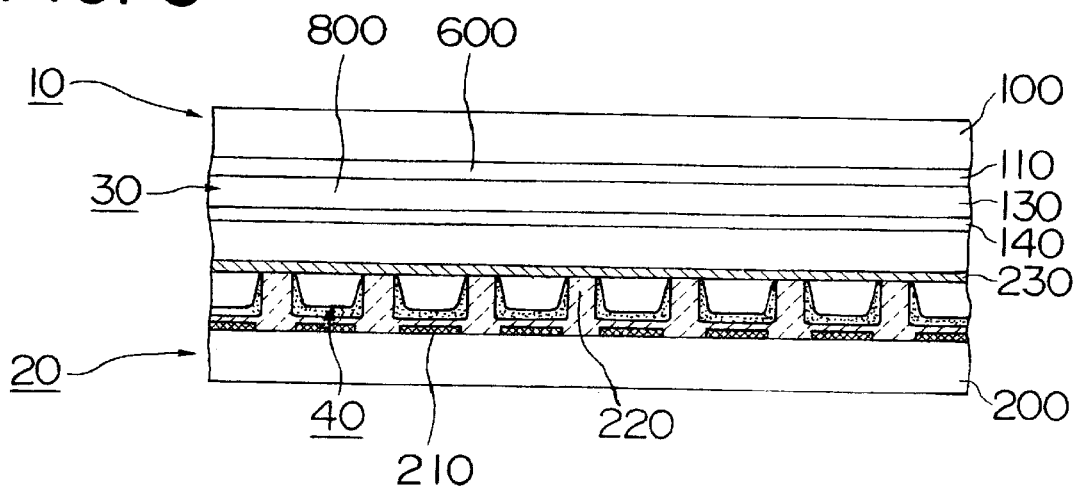

A gas discharge type display panel in accordance with the present invention has a front substrate 10, a back substrate 20, and a discharge space 30 interposed therebetween, as shown in FIGS. 1–3.

The front substrate 10 has a glass plate 100 display electrodes 110 formed parallel to each other on the glass plate 100, and bus electrodes 120 each formed on and parallel to the corresponding display electrode 110. These electrodes are covered by a dielectric layer 130 which is magnesium oxide 140.

The back substrate 20 has a glass plate 200, address electrodes 210 formed parallel to each other on the glass plate 200, and barrier ribs 220 arranged in a striped pattern, each of which is provided between adjacent two address electrodes 210 to isolate them. A fluorescencer 40, more specifically, a red fluorescencer 41, a green fluorescencer 42, and a blue fluorescencer 43, is repeatedly applied in sequence to the cells each defined by the adjacent two barrier ribs 220. For the purpose of clarity, the fluorescencer is omitted in FIG. 1. The barrier ribs 220 are protected by a protective film 230. Preferably, the proximal ends of the barrier ribs 220 do not cover the address electrodes 210. As shown in FIGS. 2 and 3, however, the proximal ends of the barrier ribs 220 may be connected to cover the glass plate 200 and the address electrodes 210.

The front substrate 10 and the back substrate 20 are faced to each other with the discharge space 30 interposed therebetween so that the extending direction of the display electrodes 110 is orthogonal to the extending direction of the address electrodes 210. An AC voltage is applied between a pair of adjoining display electrodes 110 and 110, and a voltage is applied between the address electrodes 210 and the display electrodes 110 to generate an address discharge, thereby causing a main discharge in the desired cell between barriers. The ultraviolet rays produced by this main discharge causes a fluorescence of a desired color to emit light.

First Example:

With reference to FIGS. 4–7, the manufacturing process of the back substrate 20 will be described.

Figure 4:
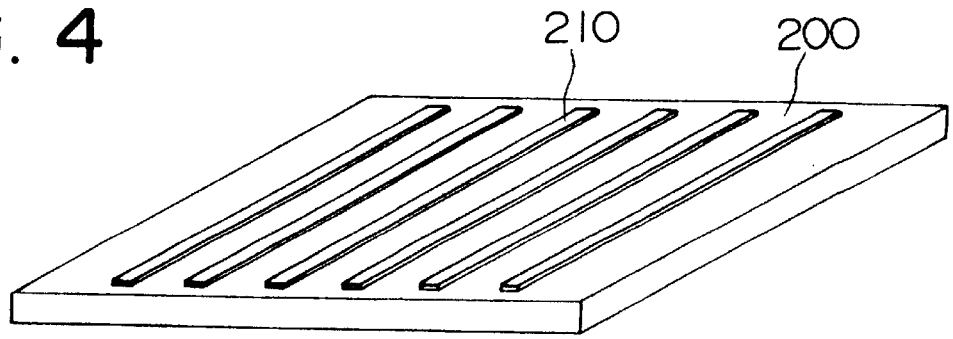
FIGS. 4–7 are perspective views showing a manufacturing process of a back substrate.

First, the address electrodes 210 are formed on the glass plate 200 by vacuum evaporation, or sputtering and photolithography, or printing (FIG. 4). For easier understanding, the number of the address electrodes 210, the dimensional proportion of the glass plate 200 and the address electrodes 210, or the like are modified.

Figure 5:
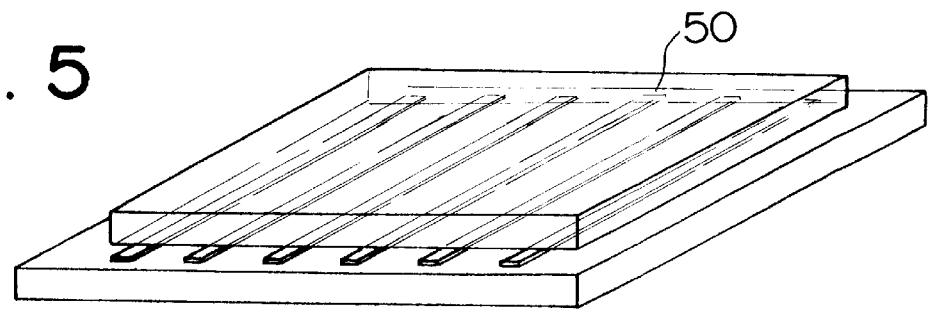

A layer of a glass paste 50 of a uniform thickness is formed on the glass plate 200 and the address electrodes 210 by printing or roll coating (FIG. 5). The thickness of the layer of the glass paste 50 approximately equal to the value obtained by dividing the total volume (or a value slightly greater than the total volume) of the finished barrier ribs 220 by the installing area thereof.

Then a forming roller 60 with plurality of grooves 61 is prepared. Each groove of the roller has a sectional configuration complementing the sectional configuration of the barrier rib 220, in the axial direction thereof. The complementary sectional configurations of the grooves 61 must be decided by taking the shrinkage of the finished barrier ribs into account. The roller 60 is heated to 200° C.–300° C.

Figure 6:
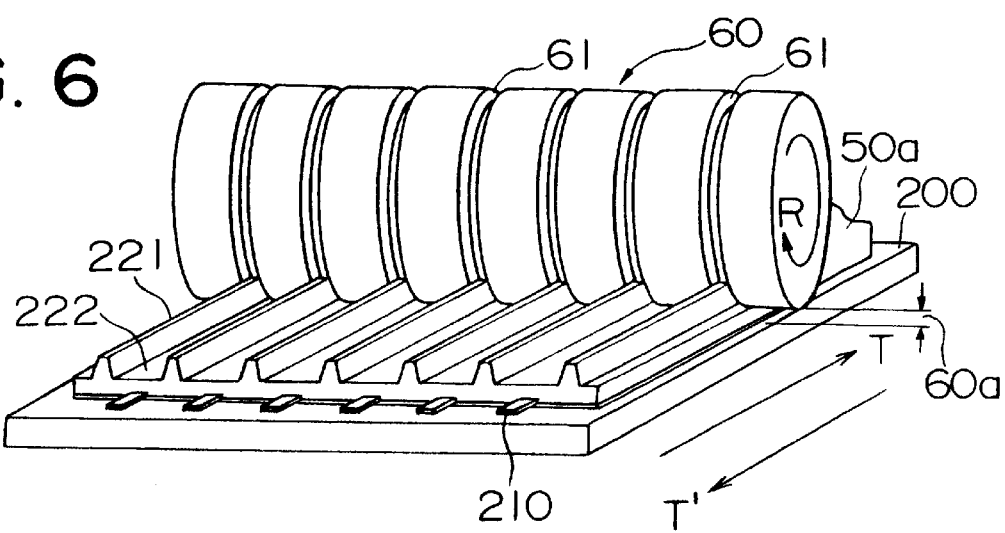

The roller 60 is pressed against the glass paste 50 and rotated in the direction of arrow R. The roller 60 is translated in the direction of arrow T along the address electrodes 210 at the same speed as the peripheral velocity of the roller 60 (FIG. 6). As the roller 60 moves, glass paste in front of the roller 60 is raised by means of the peripheral surface thereof to form paste banks 50a. The grooves 61 of the roller 60 are completely filled with the glass paste 50 in the glass paste banks 50a, thus forming barrier rib blanks 221. The glass paste banks 50a are formed mainly at the front of the moving direction of the roller 60 and they hardly spread in the axial direction of the roller 60.

The combination of the rotational motion and the translational motion of the roller may be replaced by a combination of the rotary motion of the roller and the translational motion of the glass plate 200. Namely, with the roller 60 pressed against the glass paste 50, the roller 60 may be rotated in the direction of arrow R, while the glass plate 200 is translated in the direction of arrow T', which is opposite from the direction of arrow T, along the address electrodes 210 at the same speed as the peripheral velocity of the roller 60. The roller 60 may have a large width so as to cover the full width of the glass plate 200.

Figure 7:
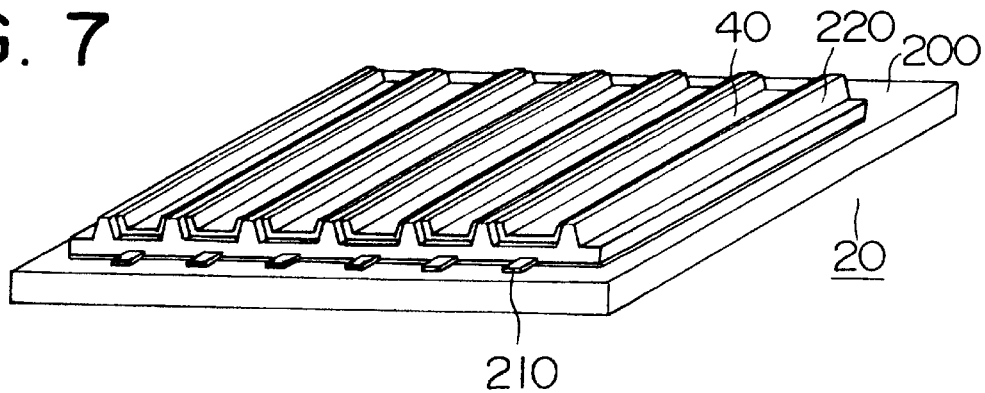

The barrier rib blank 221 is sintered at 500° C.–550° C. to obtain the finished barrier ribs 220. Further, after the fluorescencer 40 is applied to the display cells 223 defined by the barrier ribs 220 and 220 and to the side surfaces of the barrier ribs 220, the barrier rib blank together with the glass plate 200 is burnt to obtain the back substrate 20 (FIG. 7).

The glass paste 50 generally contains a glass powder, for example, a mixture of lead borosilicate glass powder and some inorganics, an organic solvent, and an organic binder. Preferably, the organic solvent is dispersed by evaporation at 150° C. or lower, and for example, terpineol. In the process shown in FIG. 6, as the roller 60, which has been heated to 200° C.–300° C., is moved on the glass paste 50, the organic solvent evaporates and disperses, so that the glass paste 50 cures to a certain extent. Thus, the roller 60 is easily separated from the glass paste 50, thereby preventing the glass paste 50 from remaining in the grooves 61 of the roller 60. The step in which the glass paste 50 is cured to a certain extent by the heat of the roller 60 takes the longest time in the manufacture of the back substrate 20 and then it is referred to as "product tact."

The organic binder is preferably completely decomposed and burnt off at 500° C. or lower, and more preferably at 450° C. or lower. It is for example cellulose resin. The heat resisting temperature of the glass plate (soda lime glass or strengthened soda lime glass) commonly used is generally 570° C.–650° C. Accordingly, the glass paste is sintered at a temperature of 500° C.–550° C., which is lower than the heat resisting temperature (570° C.–650° C.) of the glass plate, in the process illustrated in FIG. 7. Thus, the organic binder is completely decomposed and dispersed at a temperature lower than the sintering temperature (500° C.–550° C.) of the glass paste and therefore, cracks or the like are not developed in the barrier rib blanks (the glass paste).

In the process shown in FIG. 6, the thickness of the glass layer covering the address electrodes 210 can be controlled by changing the force pressing the roller 60 against the glass paste 50, that is, by changing a gap 60a between the peripheral surface of the roller 60 and the glass plate 200. The provision of the gap 60a makes it possible to absorb a camber or a distortion of the glass plate 500. The thickness of the glass layer covering the address electrodes 210 is one of the factors which influence the characteristics of the discharge taking place between the address electrodes 210 and the display electrodes 110. Ideally, the gap 60a is decreased so as to eliminate the glass layer covering the address electrodes 210, i.e. to expose the address electrodes 210.

The roller 60 rotates at a speed which satisfies the following condition, in addition to the conditions on the heating temperature of the roller and the vaporizing temperature of the organic solvent described in relation to the process illustrated in FIG. 6. Namely, while the roller 60 is in contact with the glass paste 50, the organic solvent on the surface of the portion of the glass paste 50 in contact with the roller 60 is vaporized and dispersed by the heat of the roller 60 to cure the surface to a certain extent so as to enable the roller 60 to be easily separated from the glass paste 50, thereby preventing the glass paste from being remained in the grooves 61 of the roller 60.

As an outer diameter of the roller is increased, the length of the arc which comes in contact with the glass paste is increased. This makes it possible to obtain the same curing effect for the glass paste at higher rotational speed, leading to higher productivity.

The dimensions of the sectional configuration of the groove 61 of the roller 60 differ according to the configuration of the barrier rib, i.e. the specifications of the display panel. In general, the sectional configuration of the groove 61 should be trapezoidal so that the bottom of the groove is narrower than the top opening thereof.

It is desirable that the roller 60 is made of a hard material so as to prevent the abrasion due to a large volume of hard particles contained in the glass paste 50, and the deformation due to the force or the heat applied to the roller 60 during the molding process. For example, the roller may be made of hardened steel or high-strength steel and provided with surface treatment such as hard chromium plating, or may be made of Tungsten carbide.

In this example, since the roller comes substantially in line contact with the glass paste, the stress applied to the glass plate and the roller is low when the roller is separated from the glass plate. Further, since the roller can be rigid, the roller can be repeatedly used while maintaining high transferring accuracy. Moreover, the rib blanks are formed directly on the glass paste by the roller, permitting a shorter tact time as compared with the stacking method or the engraving method.

Second Example:

Referring to FIGS. 8–11, another manufacturing process of the back substrate 20 will be described. In this example, the glass paste is chemically cured by ultraviolet light rather than being physically cured by heat.

First, a glass plate 201 is prepared which allows ultraviolet light having a wavelength of 350 nm–450 nm to pass therethrough to some extent. It can be possible to use a soda lime glass which is commonly used, as a glass plate 201.

Figure 8:
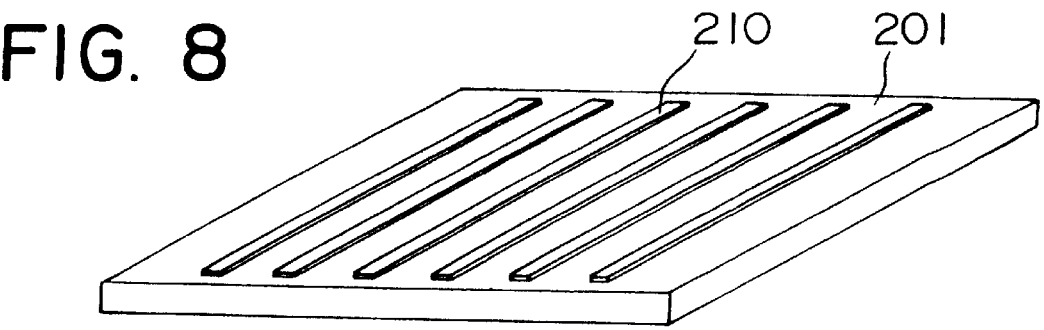
FIGS. 8–11 are perspective views showing another manufacturing process of the back substrate.

As in the case of the first example, the address electrodes 210 are formed on the glass plate 201 by vacuum evaporation, or sputtering and photolithography, or printing (FIG. 8).

Figure 9:
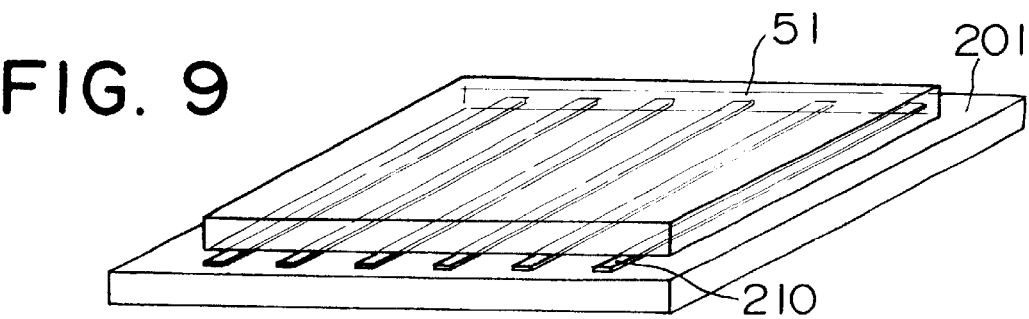

Further, as in the case of the first example, a layer of a glass paste 51 of a uniform thickness is formed on the glass plate 201 and the address electrodes 210 (FIG. 9). The glass paste 51 contains a glass powder, an organic solvent such, and an ultraviolet-curing organic binder.

Figure 10:
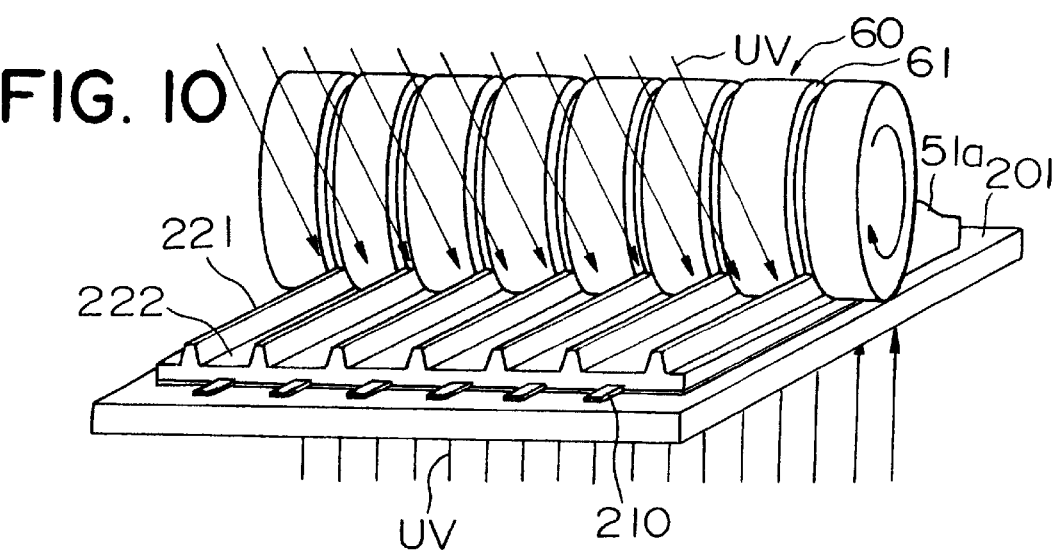

Then, a forming roller 60 is prepared, which is provided with grooves 61 which have a sectional configuration complementary to the sectional configuration of the barrier ribs 220. In this example, there is no need to heat the roller 60. With the roller 60 pressed against the glass paste 51, the roller is moved while being rotated. Ultraviolet light (UV) emitted from a metal halide lamp or a high pressure mercury lamp, from the back of the glass plate 201 and/or is directly applied from the back of the roller 60 toward the portion where the roller 60 is in contact with the glass paste 51 so as to partially cure the ultraviolet-curing organic binder contained in the glass paste 51 (FIG. 10). Thus, the barrier rib blank 221 is produced.

The rotational speed and moving speed of the roller 60 are set such that the ultraviolet-curing organic binder in the portion of the glass paste 51 in contact with the roller 60 partially cures while the roller 60 is in contact with the portion, the roller 60 is easily separated from the glass paste 51, and the glass paste is not remained in the grooves 61 of the roller 60.

After the barrier rib blank 221 is formed, ultraviolet light are further radiated until the ultraviolet-curing organic binder is completely cured. Then, the glass plate 201 is heated to 500° C.–550° C. so as to decompose and disperse the organic solvent and the organic binder and to sinter the glass powder. This finishes the barrier ribs 220.

Figure 11:
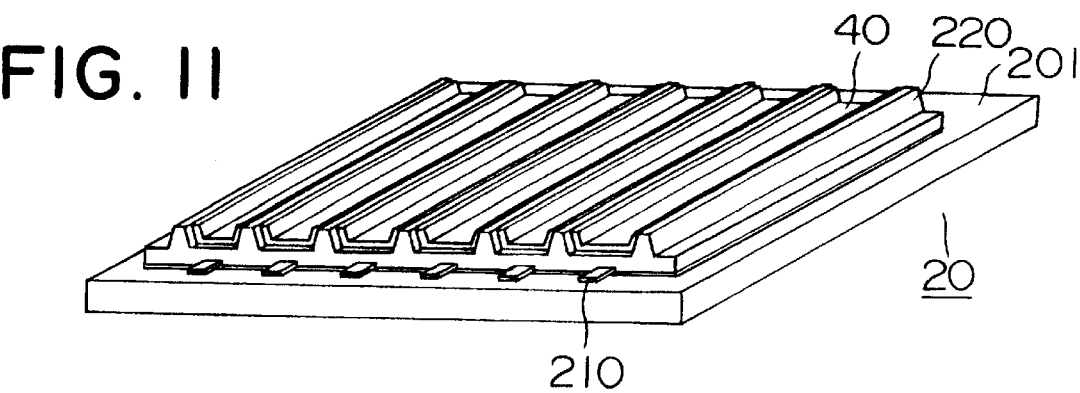

After the fluorescencer 40 is applied to display cells 222 defined by the barrier ribs 220 and 220 and to the side surfaces of the barrier ribs 220, then the glass plate 201 is burnt to obtain the back substrate 20 (FIG. 11).

For the same reason as that in the foregoing example, the ultraviolet-curing organic binder and the organic solvent are preferably decomposed and burnt off completely at 500° C. or below, and more preferably at 450° C. or below.

Figure 12:
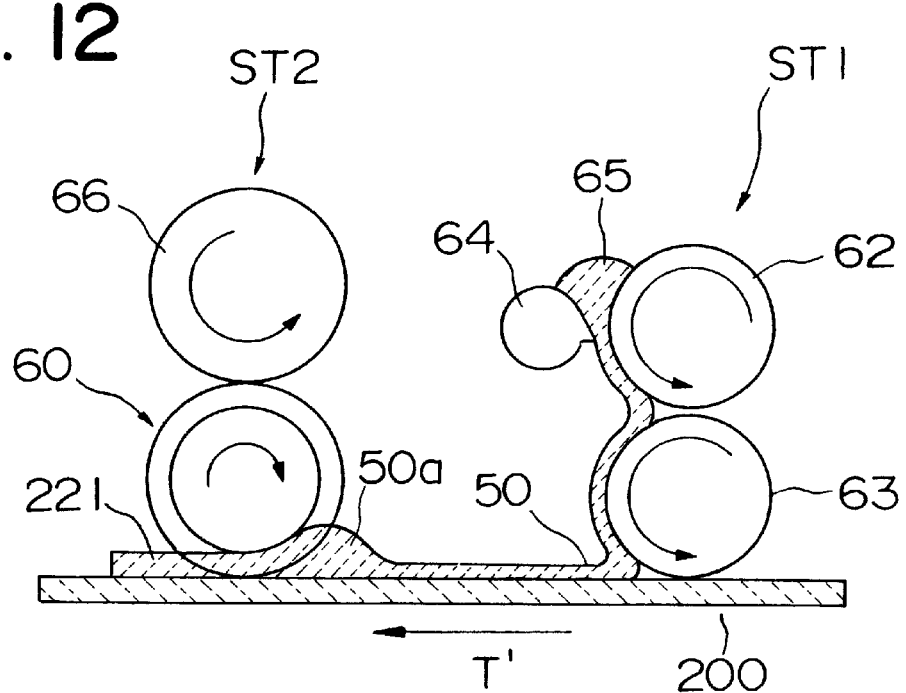
FIGS. 12 and 13 are sectional views respectively illustrating a manufacturing apparatus for the back substrate.
Figure 13:
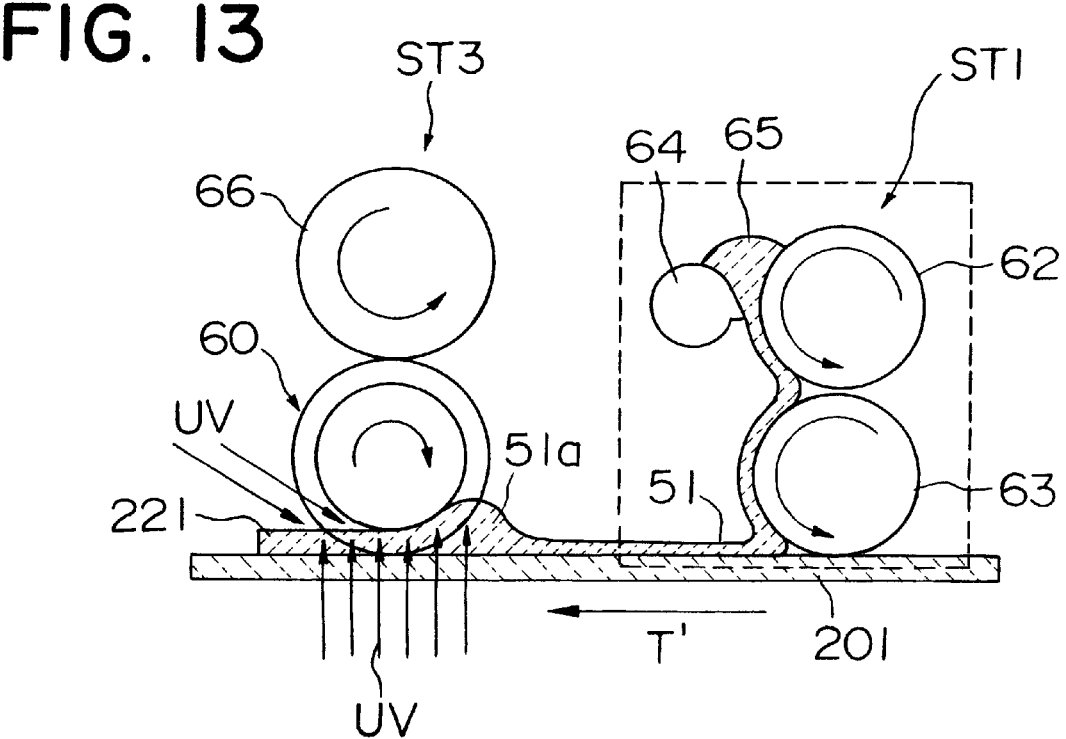

Referring now to FIG. 12 and FIG. 13 a manufacturing apparatus capable of performing the foregoing processes continuously will be described.

In FIG. 12, a conventional glass paste layer forming stage STI and a barrier rib forming stage ST2 are arranged separate from each other. The glass plate 200 on which the address electrodes have been formed passes through the glass paste layer forming state STI toward the barrier rib forming stage ST2 in the direction of arrow T'.

The glass paste layer forming stage ST1 is provided with rollers 62 and 63. A paste tank 65 defined by the roller 62 and a rod 64 contains a required amount of the glass paste 50. The glass paste 50 flows onto the glass plate 200 along the peripheral surfaces of the rotating rollers 62 and 63. The rotational speed of the rollers 62 and 63 and the moving speed of the glass plate 200 are set so as to allow the layer of the glass paste 50 having a predetermined thickness to be continuously formed on the glass plate 200. The glass paste layer forming stage ST1 may adopt the "curtain coating method" wherein the glass paste is supplied through a wide slit nozzle and formed in a layer on the glass plate, instead of adopting the "roll coating method" wherein the rollers 62 and 63 are used to form the glass paste layer. Any other method may be employed as long as it permits the glass paste to be continuously formed into an even layer on the glass plate without curing the glass paste.

The glass paste 50 which has reached the barrier rib forming stage ST2 is formed into the barrier rib blanks 221 by the rotating roller 60 as described above. The roller 60 has been heated to approximately 200° C.–300° C. by a heating device, not shown. A backup roller 66 is rotatably provided to abut against the roller 60 to protect the roller 60 from deflection caused by the reaction force produced at the time of molding the glass paste.

The glass plate 200 which has passed through the barrier rib forming stage ST2 is sintered at high temperature on the downstream side. Further, in the fluorescencer applying stage, not shown, the fluorescencer is applied to the display cells to form the back substrate 20.

In another manufacturing apparatus shown In FIG. 13, the glass paste layer forming stage STI and a barrier rib forming stage ST3 are arranged separate from each other, as in the case of the apparatus shown in FIG. 12 . The glass plate 201 on which the address electrodes 210 have been formed is passed through the glass paste layer forming stage STI and moved in the direction of arrow T toward the barrier rib forming stage ST3.

The configuration and the operation of the glass paste layer forming stage STI are the same as those shown in FIG.

12 except for the properties of the glass paste. Therefore, the description thereof will be omitted.

The glass paste 51 which has reached the barrier rib forming stage ST3 is formed into the barrier rib blanks 221 by the rotating roller 60, as described above. The portion of the glass paste 51 in contact with the roller 60 is subjected to the ultraviolet light UV directly or through the glass plate 201, which is radiated from an ultraviolet lamp, thereby partially curing the barrier rib blanks. Ultraviolet light is further radiated to the glass plate 201 which has passed through the barrier rib forming stage ST3 until the barrier rib blanks are completely cured.

The glass plate 201 is then sintered at high temperature. Lastly, in a fluorescencer applying stage, not shown, a fluorescencer is applied to the display cells to obtain the back substrate 20. Thus, a back substrate with large area can be produced at high speed.

Third Example:

Still another manufacturing process of the back substrate 20 will be described in conjunction with FIGS. 14–17. In this example, a green sheet is used in place of the glass paste.

Figure 14:
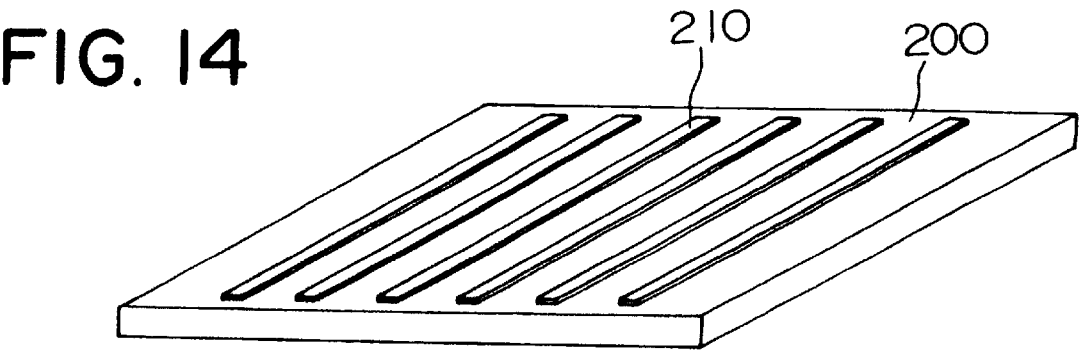
FIGS. 14–17 are perspective views illustrating still another manufacturing process of the back substrate.

The address electrodes 210 are formed on the glass plate 200 in the same manner as that of the first example (FIG. 14).

Figure 15:
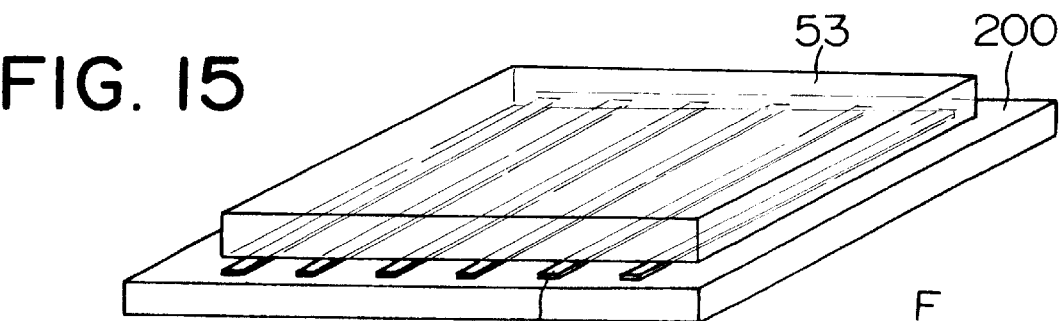

A green sheet 53 is placed on the glass plate 200 which contains a glass powder and a thermoplastic organic binder and which has a thickness almost equal to the height of the finished barrier (FIG. 15). The green sheet 53 has been heated to a temperature which is higher than a plasticizing temperature of the thermoplastic organic binder.

Figure 16:
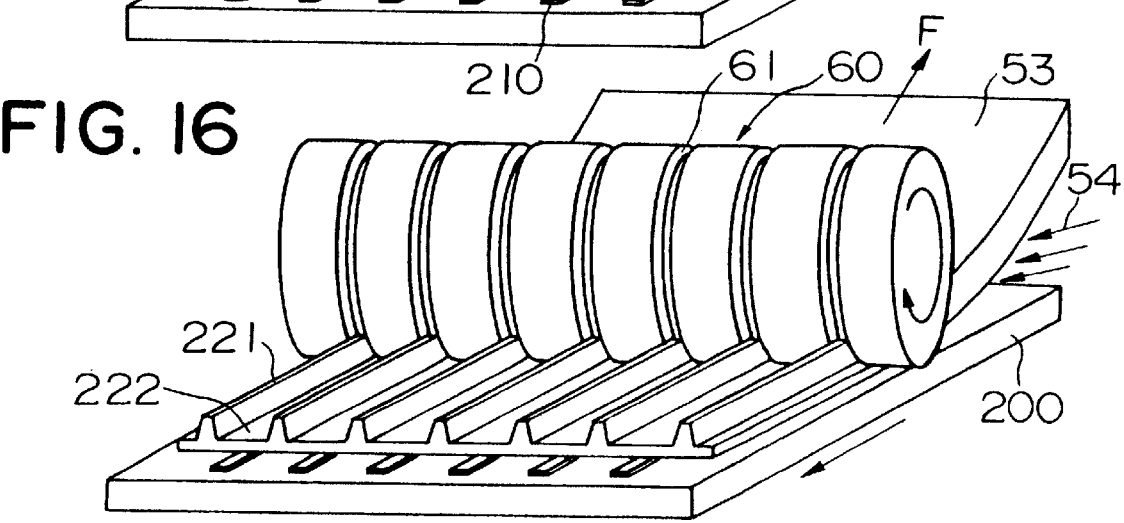

With the roller 60, on which the grooves 61 have been formed, pressed against one end of the green sheet 53, the roller 60 is rotated in the direction of an arrow. The glass plate 200 is moved in the direction of an arrow at the same speed as the peripheral velocity of the roller 60 to form the barrier rib blanks 221. The pressing pressure of the roller causes the green sheet to extend in the direction of the length thereof. Applying a tension F to the undeformed portion of the green sheet in the front upper direction removes slack caused by the extension, and the groove configuration can be replicated to the green sheet while supplying an adhesive agent 54 or a solvent between the green sheet and the glass plate. This permits precise transfer and allows the green sheet to be firmly bonded to the glass plate (FIG. 16). Preheat of the glass plate 200 and the roller 60 increases the ductility of the green sheet, thus permitting easier deformation.

Figure 17:
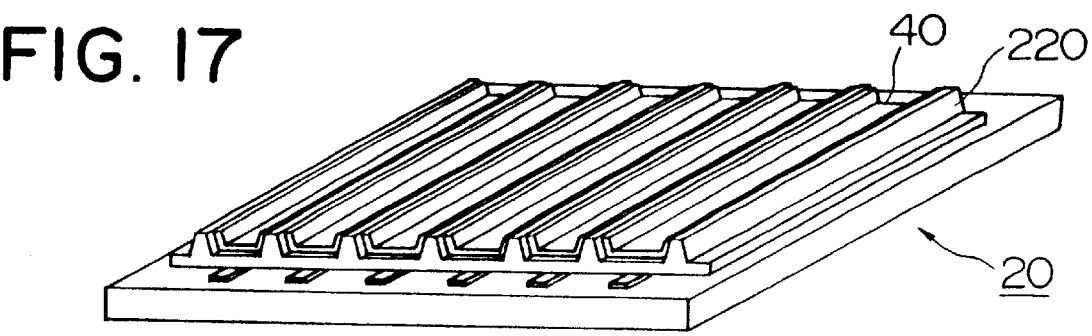

The barrier rib blank 221 is sintered at a temperature of 500° C.–550° C. to finish up the barrier ribs 220. After the fluorescencer 40 is applied to the display cells 222 defined by the barrier ribs 220 and 220 and to the side surfaces of the barrier ribs 220, the glass plate 200 is burnt to obtain the back substrate 20 (FIG. 17).

For the same reason as that in the foregoing example, it is preferable that the thermoplastic organic binder is the green sheet has a plasticizing temperature of approximately 50° C.–100° C., and decomposes and burns off at 500° C., more preferably at 450° C. Such binder is, for example, polyisobutene.

Figure 18:
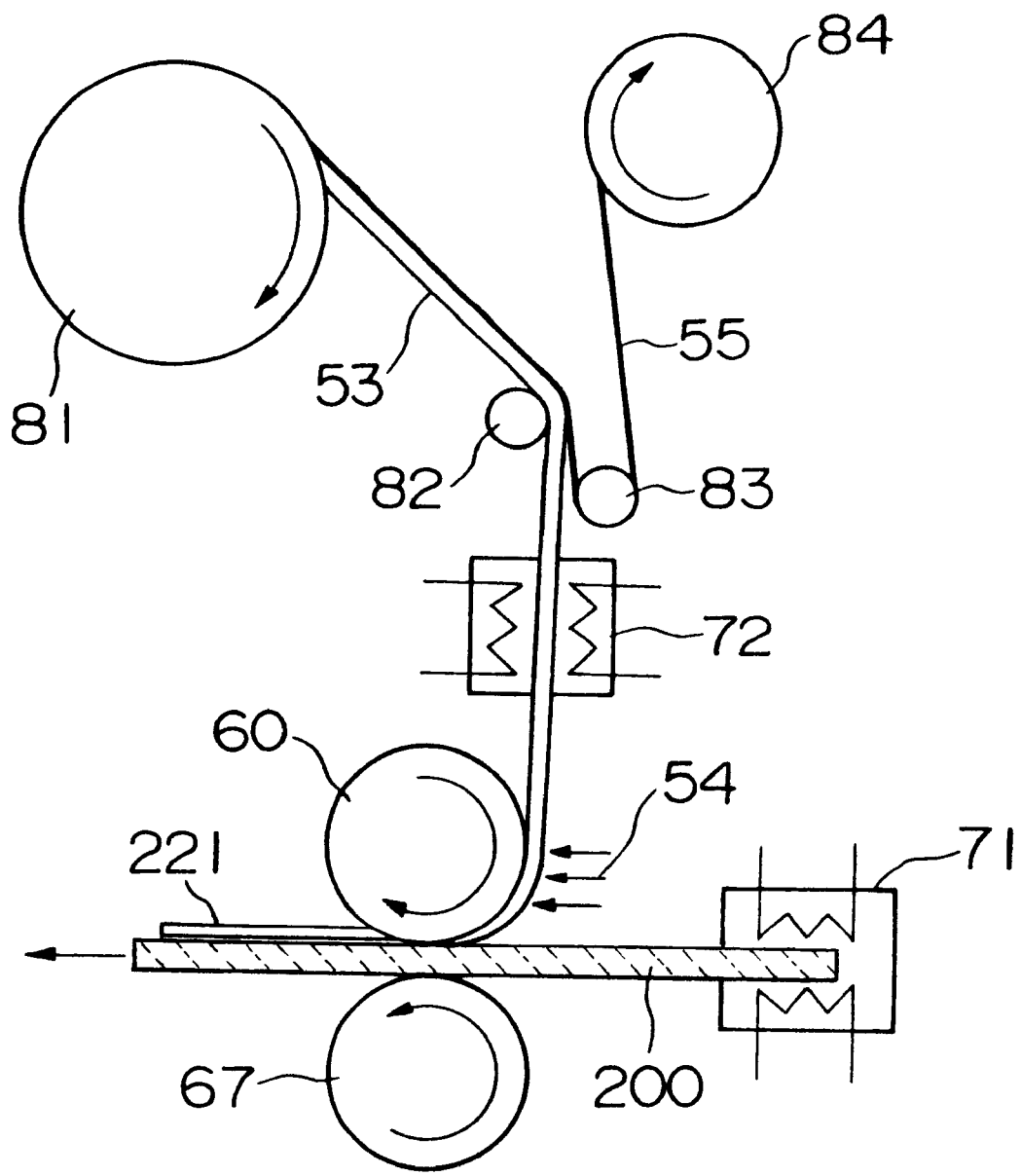
FIGS. 18 and 19 are diagrams respectively showing another manufacturing apparatus for the back substrate.

Referring now to FIG. 18, a manufacturing apparatus capable of performing the foregoing process continuously will be described.

In the manufacturing apparatus, the forming roller 60 with grooves and a counter roller 67 which cooperates with the roller 60 are provided such that they are opposed to each other with a predetermined gap therebetween. The roller 60 is heated to approximately 50° C. by a heater, which is not shown. The glass plate 200 on which the address electrodes 210 have been formed and which has been heated through a heater 71 is fed toward the gap between the roller 60 and 67.

The green sheet 53 which is casted on a carrier film 55 and wound around a reel 81 is supplied onto the glass plate 200 via a tension roller 82. In the course of the supply, the carrier film 55 is peeled off the green sheet 53 and taken up onto a reel 84 via a roller 83. The green sheet 53 is passed through a heater 72 to be heated before it is supplied onto the glass plate 200. The adhesive agent 54 is applied to the surface of the green sheet 53 to be bonded to the glass plate 200 immediately before the green sheet 53 is fed into the gap.

The glass plate 200 to which the green sheet 53 has been bonded is passed through the gap by the rotating rollers 60 and 67. At this time, the groove configurations of the roller 60 are transferred to the green sheet 53 thereby to form the barrier rib blank 221. When a predetermined length of the green sheet 53 is fed, the green sheet 53 is cut by a cutter (not shown). The slack in the green sheet caused by the stretch thereof during the foregoing transfer is absorbed by the tension generated in the green sheet 53 by making the feeding speed of the green sheet 53 from the reel 81 lower than the peripheral velocity of the roller 20.

The glass plate 200 on which the barrier rib blanks 221 has been formed is carried to a sintering stage where it is sintered, thus producing the back substrate 20.

Figure 19:
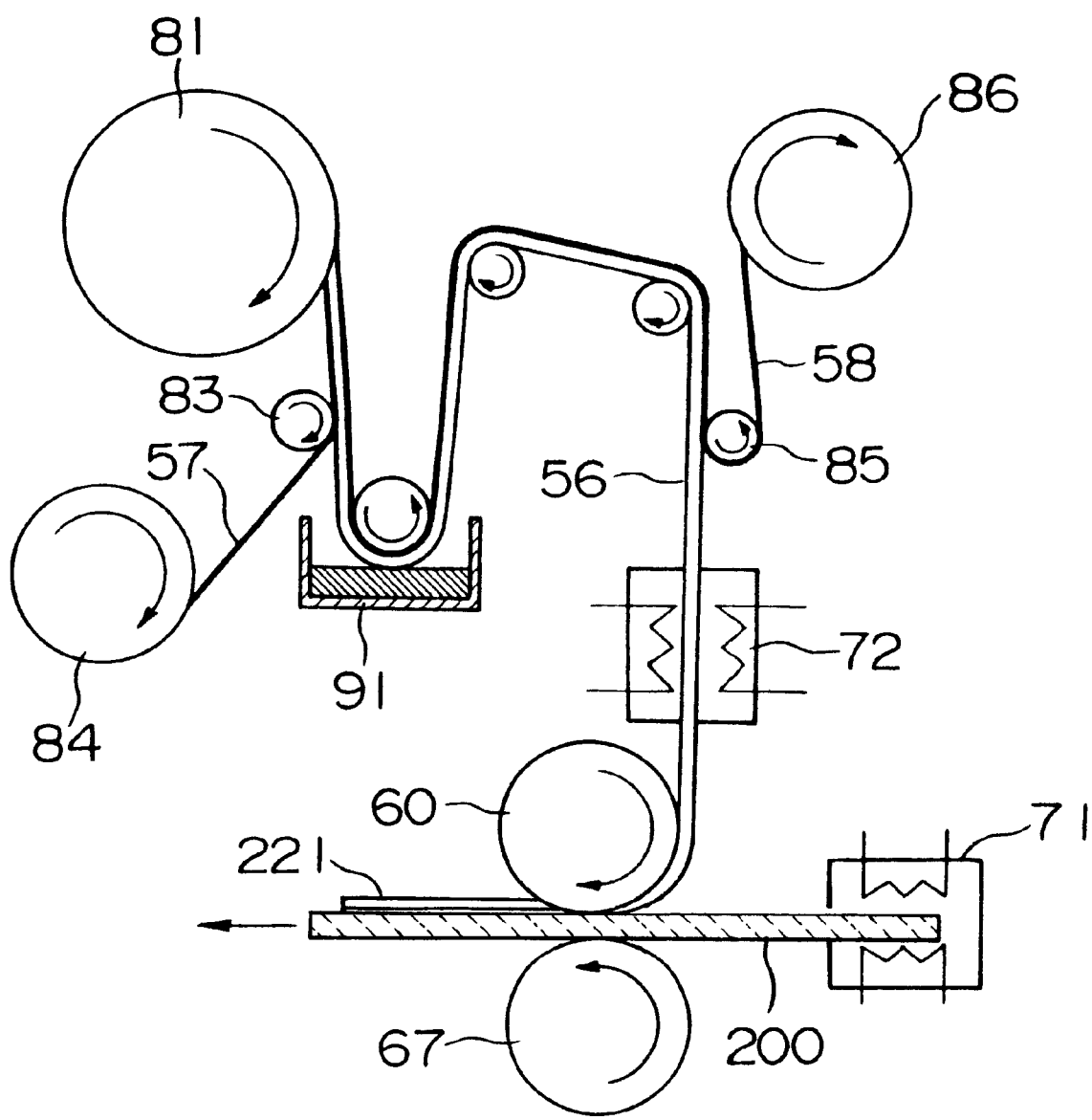

The manufacturing apparatus for an adhesive green sheet 56 will be described with reference to FIG. 19.

The green sheet 56 contains glass powder, a thermoplastic organic binder, and a plasticizer for enhancing the adhesiveness, and has a thickness approximately equal to the height of the finished barrier ribs. The green sheet 56 is wound around the reel 81, with both surfaces thereof covered by protective film 57 and 58, respectively.

The protective film 57 on one surface of the green sheet 56 supplied from the reel 81 is peeled off and taken up by the reel 84 via the roller 83. When the green sheet 56 passes through an anti-adhesion agent tank 91, the anti-adhesion agent in the tank 91 is applied to the exposed surface of the green tape 56.

After the protective film 58 on the other surface is taken up onto a reel 86 via a roller 85, the green sheet 56 is fed to the heater 72. After the green tape 56 is heated by the heater 72, it is supplied onto the glass plate 200 with the adhesive surface thereof oriented to the glass plate 200 whereas the surface with the anti-adhesion agent oriented to the forming roller 60. Thereafter, the same operation as that described in conjunction with the apparatus shown in FIG. 18 is carried out.

Fourth Example:

Referring to FIGS. 20–23, yet another manufacturing process of the back substrate 20 will be described. In this example, the green sheet is secured to the glass plate after forming the barrier ribs on the green sheet.

Figure 20:
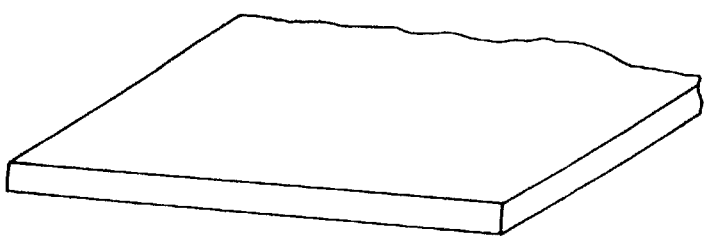
FIGS. 20–23 are perspective views illustrating a further manufacturing process of the back substrate.

A green sheet is prepared, which contains glass powder and a thermoplastic organic binder and has a thickness slightly smaller than the height of the finished barrier ribs (FIG. 20).

Figure 21:
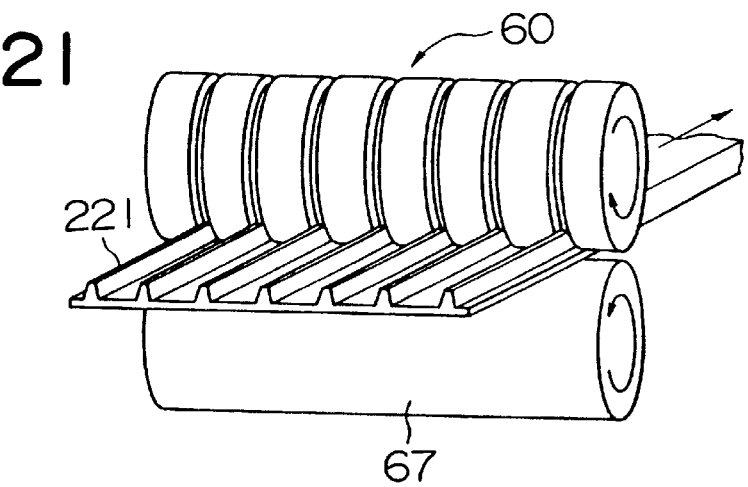

The barrier rib blanks 221 are formed by rolling on the green sheet which has been heated to a temperature which is equal to or higher than the plasticizing temperature of the thermoplastic organic binder, which rolling is carried out using the counter roller 67 and the roller 60 with grooves (which has been also heated to a temperature which is equal to or higher than the plasticizing temperature (FIG. 21).

In the rolling process, most materials pressed by the forming roller 60 and the counter roller 67 contribute solely to stretching the sheet in the longitudinal direction. They also contribute to increase the thickness of the sheet somewhat but not contribute to increase the width of the sheet. Therefore, as previously mentioned, the green sheet web should have the thickness slightly smaller than the height of the finished barrier ribs.

The sheet on which the barrier rib blanks 221 have been formed is cut into a barrier piece 59 of predetermined dimensions. A layer of an organic solvent or an adhesive agent 59a which dissolves the organic binder is applied to the flat surface of the barrier piece 59. The barrier piece 59 is secured at a predetermined position of the glass plate 200 on which the address electrodes 210 have been formed (FIG. 22).

Figure 23:
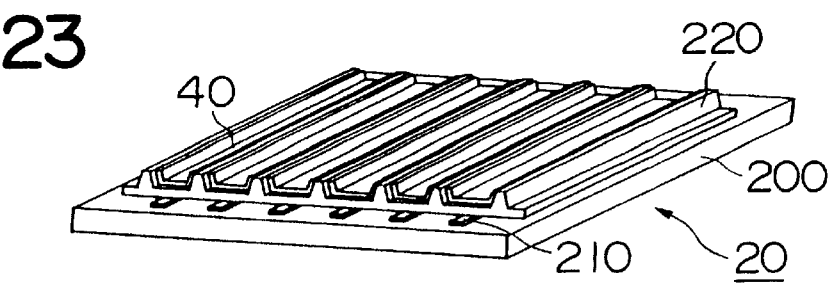

The barrier piece 59 is sintered to finish the barrier ribs 220. The fluorescencer 40 is applied to the display cells 222 defined by the barrier ribs and the side surfaces of the barrier ribs 220, then the glass plate 200 is burnt to complete the back substrate 20 (FIG. 23).

Figure 22:
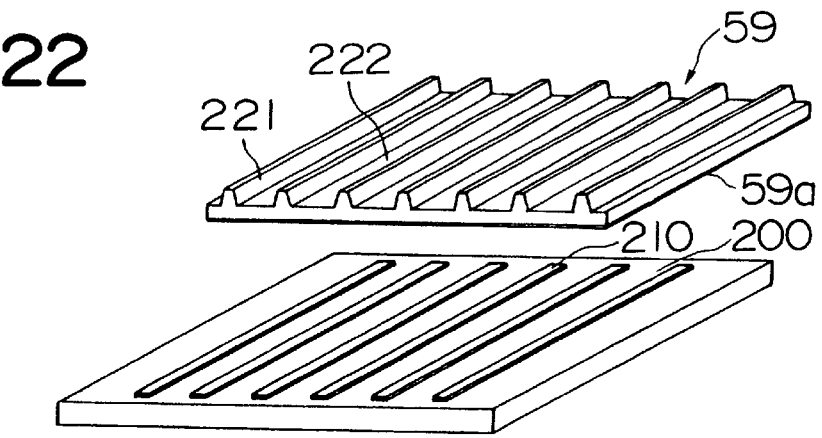
Figure 24:
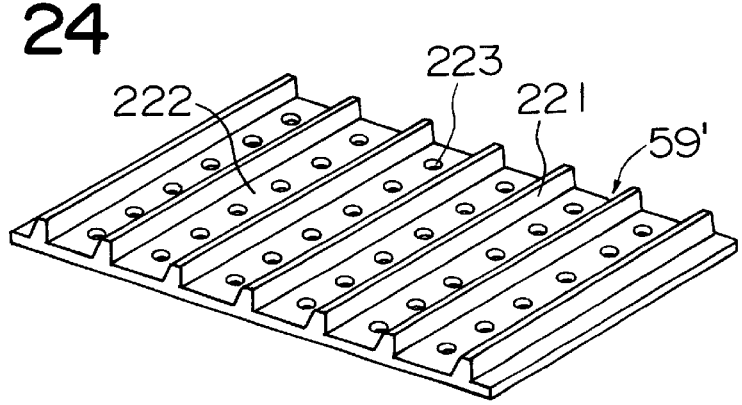
FIG. 24 is a perspective view showing another type of green sheet.

In the process shown in FIG. 22, a barrier piece 59' shown in FIG. 24 may be used instead of the barrier piece 59. The barrier piece 59' has aperture arrays 223 for partly expose the address electrodes 210 to improve discharge efficiency and luminous efficiency. The aperture arrays 223 of the barrier piece 59, are formed at the portions thereof which bridge the proximal end parts of the barrier ribs, i.e. the bottom portions of the display cells.

It Is obvious that the apertures are extremely small, considering the size of the display panel. Hence, the aperture arrays 223 are formed using, for example, a combination of a carbon dioxide laser (CO2 laser) and a galvanomirror, or a combination of a metal mask and an excimer laser. The laser beam emitted from the carbon dioxide laser is focused and intermittently scanned toward the barrier piece 59' by the galvanomirror to form the aperture arrays. As an alternative, a metal mask in which the corresponding aperture arrays have been formed is mounted on the flat surface of the barrier piece 59', and the laser beam which is emitted from the excimer laser and which has been turned into a parallel beam by a collimator is radiated toward the metal mask so as to form the aperture arrays in the barrier piece 59'.

Alternatively, the aperture arrays may be formed in the sheet in advance at predetermined positions by press-cutting or the like with taking the elongation of the green sheet web into account.

Figure 25:
FIG. 25 is a perspective view showing another type of forming roller.
Figure 26:
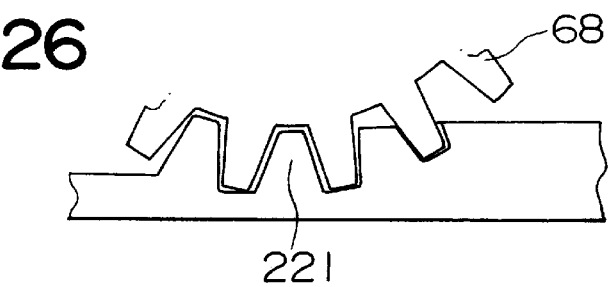
FIG. 26 is a partially fragmentary sectional view illustrating an engagement between the grooves of the roller and a barrier rib blank.

The forming roller used in the examples described above is a roller 68 having a plurality of peripheral grooves which have sectional configurations complementary to the sectional configurations of the barrier ribs 220 and which are arranged in the axial direction. However, the forming roller is not limited thereto. The forming roller may be the one shown in FIG. 25 that has a plurality of axial grooves which have the sectional configurations complementary to the sectional configurations of the barrier ribs 220 and which are arranged equiangularly. In this case, the outer diameter of the roller is decided so that the axial grooves may be provided equiangularly, with taking the intervals among the barrier ribs 220 into consideration. Further, the cross-sectional configurations of the grooves are trapezoidal as illustrated in FIG. 26 to prevent the interference between the barrier rib 18 blanks 221 and the ridges of the forming roller.

Figure 27:
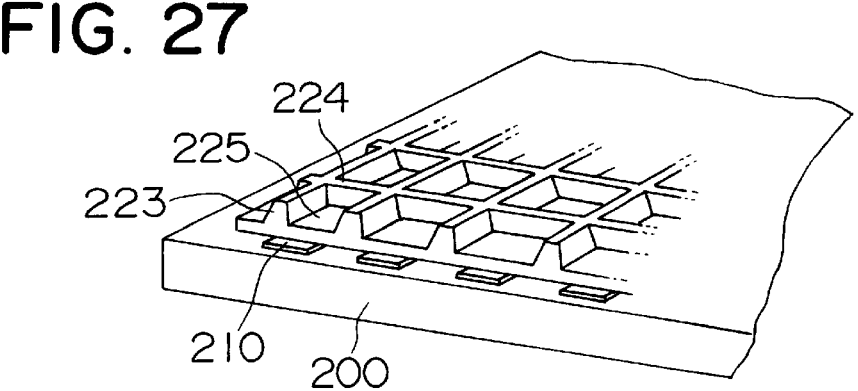
FIG. 27 is a partially fragmentary perspective view showing another type of a back substrate.

Fifth Example:

A description will be given to a manufacturing process of a back substrate which has longitudinal barrier ribs 223 and lateral barrier ribs 224 which are arranged in a grid pattern as shown in FIG. 27 rather than the back substrate which employs the barrier ribs arranged in the stripe pattern. The longitudinal barrier ribs 223 and the lateral barrier ribs 224 define display cells 225 which are isolated from each other. The barrier ribs arranged in the grid pattern provide a larger area to which a fluorescencer is applied and prevent maldischarge or cross talk among the neighboring display cells. These features enable higher contrast.

The manufacturing process of this type of back substrate is the same as those described above except for the forming roller. Therefore, only a forming roller 600 will be described.

Figure 28:
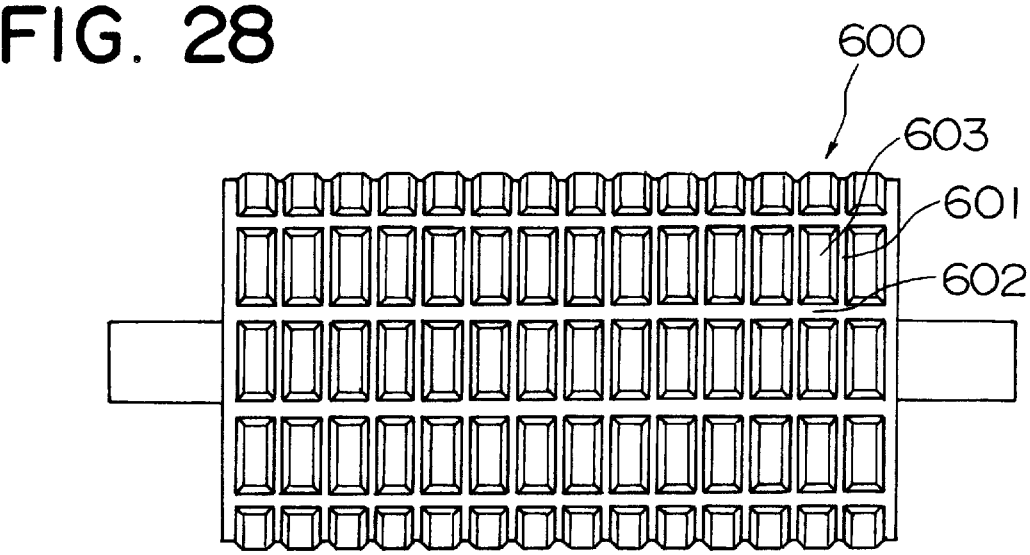
FIGS. 28–29 are front views respectively showing a roller for forming the back substrate of FIG. 27.

As shown in FIG. 28, the roller 600 is provided with a plurality of peripheral grooves 601 and a plurality of axial grooves 602, which define thereamong truncated quadrilateral pyramids 603 corresponding to the respective display cells. The side surfaces of the truncated quadrilateral pyramids are slant so as to prevent the interference with the barrier rib blank when the roller 600 rotates.

Figure 29:
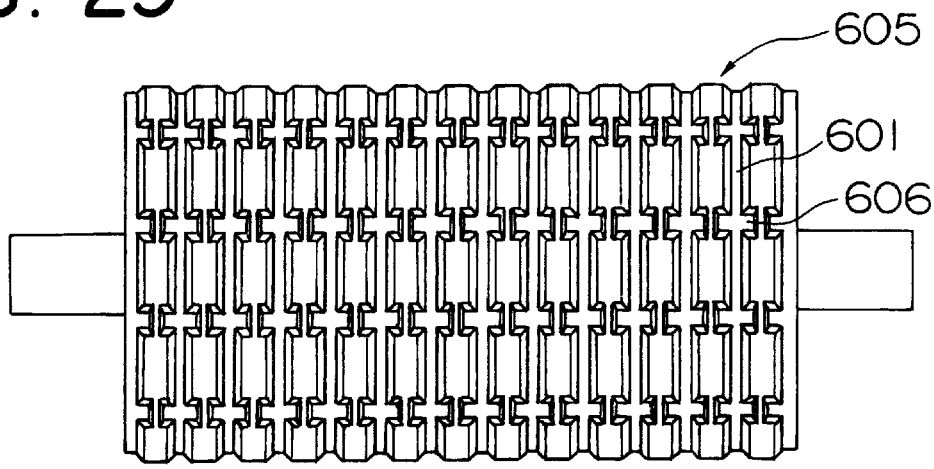

As the forming roller, a roller 605 shown in FIG. 29 may be employed. The roller 605 is provided with a plurality of peripheral grooves 601 and a plurality of axial grooves 606 interrupted at a plurality of portions. The display cells formed using the roller 605 are partly connected and not completely isolated from one another. However, the same advantages as those described previously will be obtained.

As compared with the stamper, the forming roller can be easily separated from the glass paste even though the intervals of the barrier ribs, i.e. the width of the groove is decreased. This enables more display cells to be formed per unit area, and then a higher resolution can be obtained.

The foregoing process can be applied also for forming the barrier ribs of the front substrate.

Figure 30:
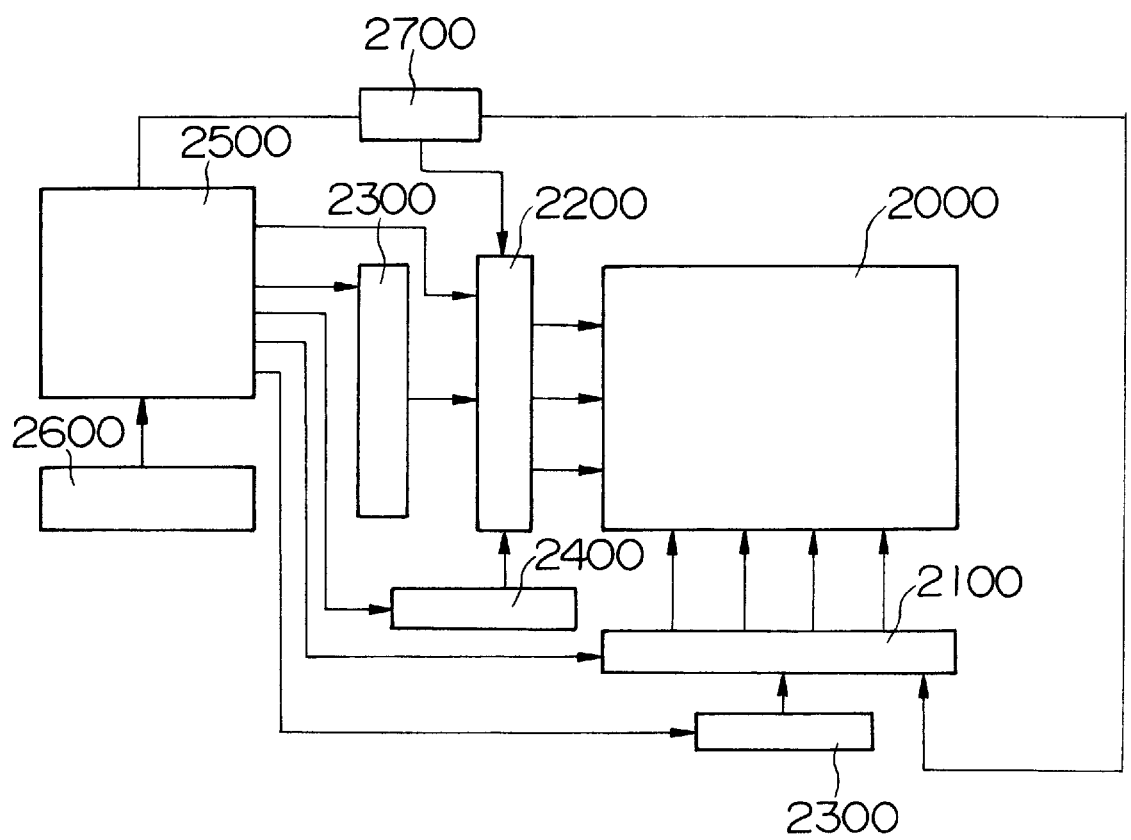
FIG. 30 is a circuit diagram of a displaying arrangement which employs the display panel in accordance with the present invention.

A displaying arrangement employing a display panel 2000 shown in FIG. 1 will be described in conjunction with FIG. 30.

A pulse generator 2300 supplies a pulse voltage via an address driver 2100 and a scan driver 2200 to an electrode corresponding to the display cell selected by a control circuit 2500 so as to cause main discharge. This in turn causes the desired display cell to emit light. The address driver 2100 and the scan driver 2200 are controlled by the control circuit 2500. The control signals are sent to the scan driver 2200 from the control circuit 2500 via a level shifter 2400 . An auto power control circuit 2600 detects high voltage power current. If the high voltage power current exceeds a specified value, the control circuit 2600 sends a signal for decreasing the number of discharge pulses to be maintained to the control circuit 2500 . A DC—DC converter 2700 converts the voltage supplied from outside to the voltage for the circuitry.

What is claimed is:

1. A manufacturing method for a gas discharge display panel comprising the steps of:

applying a glass paste to a substrate on which electrodes extending in a predetermined direction have been formed;

heating a roll;

rotating said roll, on which grooves corresponding to barrier ribs have been formed, in order to form glass paste applied to said substrate into barrier rib blanks at least extending in the predetermined direction; and sintering said formed barrier rib blanks to obtain barrier ribs.

2. A method according to claim 1, wherein said glass paste contains an organic solvent; and the step of heating said roll enables vaporization of the organic solvent in said glass paste to form said barrier rib blanks.

3. A manufacturing method for a gas discharge display panel comprising the steps of:

applying a glass paste to a substrate on which electrodes extending in a predetermined direction have been formed, said glass paste containing an ultraviolet-curing organic binder;

rotating a roll, on which grooves corresponding to barrier ribs have been formed, in order to form the glass paste applied to said substrate into barrier rib blanks at least extending in the predetermined direction;

radiating ultraviolet rays directly to said glass paste to an area behind said roll in the rotating direction of said roll to cure said barrier rib blanks which are formed; and sintering said formed barrier rib blanks to obtain barrier ribs.

4. A method according to claim 3, wherein said ultraviolet rays are radiated to an area where said roll is in contact with said glass paste.

5. A manufacturing method for a gas discharge display panel comprising the steps of:

rotating a heated roll, on which grooves corresponding to barrier ribs have been formed so as to form barrier rib blanks extending at least in a predetermined direction on a green sheet;

placing said green sheet, on which said barrier rib blanks have been formed, on a substrate on which electrodes have bee formed and which extend in the same predetermined direction as the barrier rib blanks; and sintering said green sheet placed on said substrate.

6. A manufacturing method for a gas discharge display panel comprising the steps of:

placing said green sheet on a substrate which has electrodes extending in a predetermined direction formed on the surface thereof;

rotating a heated roll, on which grooves corresponding to barrier ribs have been formed, so as to form barrier rib blanks at least extending in the predetermined direction on said green sheet; and sintering said green sheet placed on said substrate.

7. A method according to claim 5, wherein said green sheet contains a thermoplastic organic binder; and wherein said barrier rib blanks are formed after heating said green sheet to soften it.

8. A method according to claim 6, wherein said green sheet contains a thermoplastic organic binder; and wherein said barrier rib blanks are formed after heating said green sheet to soften it.

9. A method according to any one of claims 1 to 8, wherein said roll has circumferential grooves on a cylindrical surface thereof so as to form the barrier rib blanks extending at least in the predetermined direction during translational movement of the roll with respect to the at least one of said substrate and said green sheet in the predetermined direction.

10. A method according to any one of claims 1 to 8, wherein said roll has projections arranged in a grid pattern on a cylindrical surface thereof so as to form the barrier rib blanks extending at least in the predetermined direction during translational movement of the roll with respect to the at least one of said substrate and said green sheet in the predetermined direction.

* * * * *